United States Patent
Lee et al.

(10) Patent No.: US 11,507,101 B2
(45) Date of Patent: Nov. 22, 2022

(54) VEHICLE USING SPATIAL INFORMATION ACQUIRED USING SENSOR, SENSING DEVICE USING SPATIAL INFORMATION ACQUIRED USING SENSOR, AND SERVER

(71) Applicant: SEOUL ROBOTICS CO., LTD., Seoul (KR)

(72) Inventors: HanBin Lee, Seoul (KR); Jaeil Park, Seoul (KR); Hong Minh Truong, Suwon-si (FR); Oran Kwon, Hanam-si (KR)

(73) Assignee: SEOUL ROBOTICS CO., LTD., Seoul (KR)

( * ) Notice: Subject to any disclaimer, the term of this patent is extended or adjusted under 35 U.S.C. 154(b) by 543 days.

(21) Appl. No.: 16/573,645

(22) Filed: Sep. 17, 2019

(65) Prior Publication Data

US 2020/0218276 A1    Jul. 9, 2020

(30) Foreign Application Priority Data

Jan. 4, 2019   (KR) .................. 10-2019-0001312
Mar. 14, 2019  (KR) .................. 10-2019-0029372

(51) Int. Cl.
  *G05D 1/02*    (2020.01)
  *G06T 7/246*   (2017.01)
  (Continued)

(52) U.S. Cl.
  CPC .......... *G05D 1/0231* (2013.01); *G01S 7/4802* (2013.01); *G01S 13/865* (2013.01);
  (Continued)

(58) Field of Classification Search
  CPC ........ G05D 1/02; B60W 40/02; B60W 30/13; G01S 17/42; G01S 17/66; G01S 17/41; G01S 17/48
  See application file for complete search history.

(56) References Cited

U.S. PATENT DOCUMENTS 8,437,947 B2 *  5/2013  Yoo .................... G05D 1/0282
                                              701/400
9,230,444 B2    1/2016  Lascombes et al.
(Continued)

FOREIGN PATENT DOCUMENTS

KR        10-0825761 B1      4/2008
KR    10-2010-0118313 A     11/2010
(Continued)

OTHER PUBLICATIONS

International Search Report and Written Opinion in corresponding International Patent Application No. PCT/KR2019/011949 dated Jan. 6, 2019, 14 pages.

(Continued)

*Primary Examiner* — Tan Q Nguyen
(74) *Attorney, Agent, or Firm* — Knobbe, Martens, Olson & Bear, LLP

(57) ABSTRACT

Provided is a method of sensing a three-dimensional (3D) space using at least one sensor. The method can include acquiring spatial information over time for the sensed 3D space, applying a neural network based object classification model to the acquired spatial information over time to identify at least one object in the sensed 3D space. The method can also include tracking the sensed 3D space including the identified at least one object, and using information related to the tracked 3D space.

19 Claims, 16 Drawing Sheets

(51) Int. Cl.
*G06K 9/62* (2022.01)
*G05D 1/00* (2006.01)
*G01S 17/87* (2020.01)
*G01S 13/86* (2006.01)
*G01S 17/89* (2020.01)
*G01S 7/48* (2006.01)
*G06N 3/04* (2006.01)
*G01S 17/931* (2020.01)
*G06V 20/58* (2022.01)
*G01S 17/42* (2006.01)
*G06N 3/08* (2006.01)

(52) U.S. Cl.
CPC .............. *G01S 17/87* (2013.01); *G01S 17/89* (2013.01); *G01S 17/931* (2020.01); *G05D 1/0088* (2013.01); *G05D 1/0255* (2013.01); *G05D 1/0257* (2013.01); *G05D 1/0276* (2013.01); *G06K 9/628* (2013.01); *G06N 3/04* (2013.01); *G06T 7/246* (2017.01); *G06V 20/58* (2022.01); *G05D 2201/0213* (2013.01); *G06N 3/08* (2013.01); *G06T 2207/10028* (2013.01); *G06T 2207/20084* (2013.01); *G06T 2207/30261* (2013.01)

(56) References Cited

U.S. PATENT DOCUMENTS

| | | | |
|---|---|---|---|
| 2017/0369051 | A1 | 12/2017 | Sakai et al. |
| 2018/0136644 | A1* | 5/2018 | Levinson ............ H04L 41/0816 |
| 2018/0307944 | A1* | 10/2018 | Li ........................ G06K 9/6256 |
| 2018/0349746 | A1* | 12/2018 | Vallespi-Gonzalez ...................... G06V 20/58 |
| 2018/0364717 | A1 | 12/2018 | Douillard et al. |
| 2019/0094040 | A1* | 3/2019 | Lewis .................... B60Q 9/008 |
| 2020/0064483 | A1* | 2/2020 | Li ......................... G01S 13/931 |
| 2020/0109954 | A1* | 4/2020 | Li ......................... G05D 1/0278 |
| 2020/0182626 | A1* | 6/2020 | He ........................... G06T 7/73 |

FOREIGN PATENT DOCUMENTS

| | | |
|---|---|---|
| KR | 10-2014-0032658 A | 3/2014 |
| WO | 2017-079460 A2 | 5/2017 |

OTHER PUBLICATIONS

Supplementary Partial European Search Report for European Application No. 19907465 dated Sep. 28, 2021 in 15 pages.
Seoul Robotics, "Lidar Vision Software for VLP-16", <https://www.youtube.com/watch?v=INHDwpccskM>, uploaded on Nov. 6, 2018.
Extended European Search Report for European Application No. 19907465 dated Jan. 20, 2022 in 16 pages.

* cited by examiner

VEHICLE USING SPATIAL INFORMATION ACQUIRED USING SENSOR, SENSING DEVICE USING SPATIAL INFORMATION ACQUIRED USING SENSOR, AND SERVER

CROSS-REFERENCE TO RELATED APPLICATIONS

This application claims the benefit of Korean Patent Application Nos. 10-2019-0001312 and 10-2019-0029372, respectively filed on Jan. 4, 2019 and Mar. 14, 2019, in the Korean Intellectual Property Office, the disclosures of which are incorporated herein in their entirety by reference.

BACKGROUND

1. Field

The disclosure relates to a vehicle, a sensing device utilizing spatial information acquired using a sensor, and a server.

2. Description of Related Art

With the fourth industrial revolution, interest in technical fields such as autonomous vehicles, drones, robots, etc. is increasing. In order for autonomous vehicles, drones, robots, etc. to stably and correctly operate, it is important to collect data required for controlling operations. In regard of this, studies into methods for utilizing various kinds of sensors have been conducted.

SUMMARY

There are provided a vehicle, a sensing device utilizing spatial information acquired using a sensor, and a server.

Additional aspects will be set forth in part in the description which follows and, in part, will be apparent from the description, or may be learned by practice of the presented embodiments of the disclosure.

According to a first aspect, a vehicle includes: a sensor unit configured to successively sense a three-dimensional (3D) space by using at least one sensor; a memory storing a computer executable instruction; and a processor configured to execute the computer executable instruction to acquire spatial information over time for the sensed 3D space, identify at least one object in the sensed 3D space by applying a neural network based object classification model to the acquired spatial information over time, track the sensed 3D space including the identified at least one object, and control driving of the vehicle based on information related to the tracked 3D space and information related to a movement and position of the vehicle.

According to a second aspect, a sensing device includes: a sensor unit configured to sense a 3Dimensional (3D) space successively by using at least one sensor; a communication interface; a memory storing an computer executable instruction; a processor configured to execute the computer executable instruction to acquire spatial information over time for the sensed 3D space, identify at least one object in the sensed 3D space by applying a neural network based object classification model to the acquired spatial information over time, track the sensed 3D space including the identified at least one object, and transmit information related to the tracked 3D space to outside through the communication interface.

According to a third aspect, a server includes: an communication interface; a memory storing a computer executable command; and a processor configured to execute the computer executable instruction to receive information related to a 3D space tracked by at least one vehicle and corresponding to a movement location of the at least one vehicle through the communication interface, receive information related to a 3D space tracked by at least one sensing device installed on a path along which the vehicle travels and corresponding to a fixed location of the at least one sensing device through the communication interface, and reconstruct information related to a 3D space corresponding to a predetermined region to which both the movement location of the at least one vehicle and the fixed location of the at least one sensing device belong, based on the information related to the 3D space corresponding to the movement location of the at least one vehicle and the information related to the 3D space corresponding to the fixed location of the at least one sensing device.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Hereinafter, various embodiments will be described in detail with reference to the accompanying drawings. The embodiments which will be described below may be modified in different forms and implemented. For more clearly describing the characteristics of the embodiments, detailed descriptions about contents well-known to one of ordinary skill in a technical field to which the following embodiments belong will be omitted.

The embodiments relate to a vehicle, a sensing device utilizing spatial information acquired using a sensor, and a server, and detailed descriptions about contents well-known to one of ordinary skill in a technical field to which the following embodiments belong will be omitted.

Figure 1:
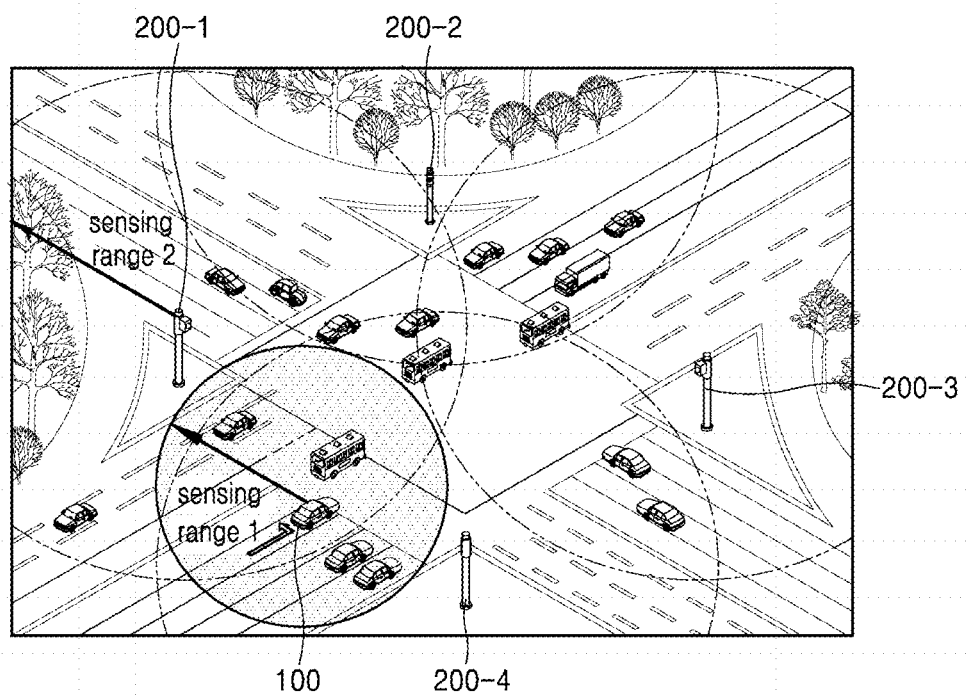
FIG. 1 shows an arbitrary driving environment wherein a vehicle and a sensing device according to an embodiment are located.

FIG. 1 shows an arbitrary driving environment wherein a vehicle 100 and a sensing device 200 according to an embodiment are located.

Referring to FIG. 1, the vehicle 100 stops at an intersection for waiting for the light, and a plurality of sensing devices 200-1, 200-2, 200-3, and 200-4 (also referred to as the sensing device 200) are located around corners of the intersection.

The vehicle 100 may be driving means, such as a car or a train, traveling on a road or tracks. However, when the vehicle 100 flies in the air not on a road or tracks, the meaning of the vehicle 100 may extend to flying means, such as a drone, a plane, etc., or when the vehicle 100 sails the seas, the meaning of the vehicle 100 may extend to vessel means, such as a boat, a ship, etc. Hereinafter, for convenience of description, the vehicle 100 is assumed to be an autonomous vehicle. The vehicle 100 may sense, for autonomous driving, a surrounding space using a sensor to acquire spatial information.

The sensing device 200, which is an apparatus capable of sensing a surrounding space to acquire spatial information, may include at least one sensor. The sensing device 200 may be installed on the ground or at a predetermined height from the ground. The sensing device 200 may be attached on or fixed at an existing facility.

The vehicle 100 and the sensing device 200 may each include at least one of various kinds of sensors, such as a light detection and ranging (LiDAR) sensor, a radar sensor, a camera sensor, an infrared imaging sensor, an ultrasonic sensor, etc. The vehicle 100 and the sensing device 200 may each use a plurality of sensors of the same kind or combine and use a plurality of sensors of different kinds, in consideration of sensing ranges or obtainable data types of the individual kinds of sensors, to acquire spatial information for a 3D space.

A sensing range that may be sensed by the vehicle 100 may be identical to or different from a sensing range that may be sensed by the sensing device 200, depending on kinds of sensors included in the vehicle 100 and the sensing device 200. In FIG. 1, sensing ranges that may be respectively sensed by the vehicle 100 and the sensing device 200 are shown. Referring to FIG. 1, a first sensing range that may be sensed by the vehicle 100 is shown to be smaller than a second sensing range that may be sensed by the sensing device 200, although not limited thereto. Although the same kind of sensors are included in the vehicle 100 and the sensing device 200, a sensing range of the vehicle 100 may be different from that of the sensing device 200 depending on installation locations of the sensors in the vehicle 100 and the sensing device 200 or surrounding environments. For example, because the sensing device 200 is fixed at a higher location than the vehicle 100 and the moving vehicle 100 may meet various objects obstructing sensing of a 3D space at closer locations than the fixed sensing device 200, the second sensing range that the sensing device 200 may sense may be larger than the first sensing range that the vehicle 100 may sense.

The vehicle 100 may itself acquire spatial information for a surrounding 3D space by using a sensor for autonomous driving. To acquire spatial information for a wider space corresponding to a traveling direction in advance, the vehicle 100 may receive spatial information that itself may not acquire, from outside. For example, the vehicle 100 may receive spatial information from other vehicles or the sensing device 200 around the vehicle 100.

Hereinafter, a method of using spatial information acquired by the vehicle 100 in autonomous driving, a method of transmitting spatial information acquired by the sensing device 200 to another surrounding device, and a method of combining spatial information acquired by the vehicle 100 with spatial information acquired by the sensing device 200 to acquire and use spatial information for a wider 3D space will be described in detail.

Figure 2:
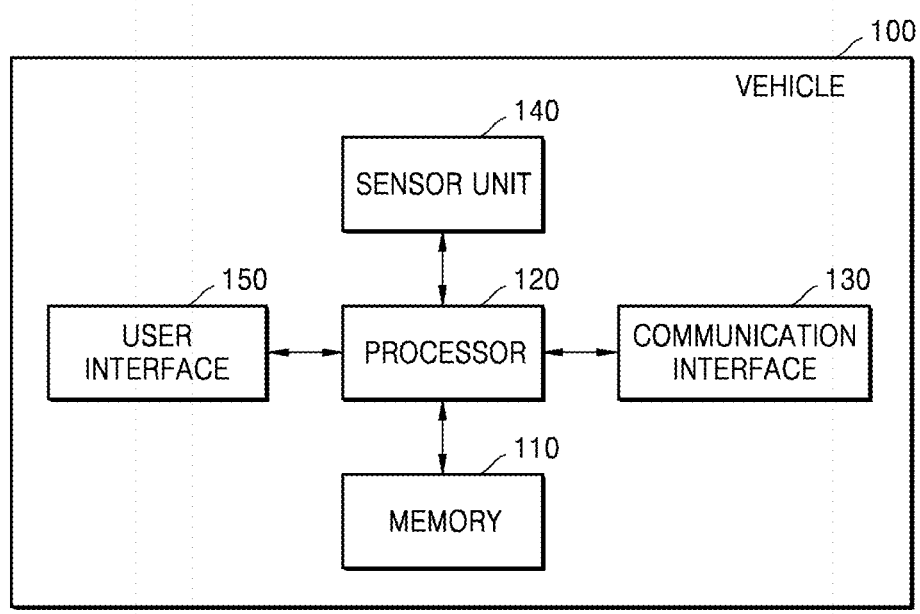
FIG. 2 is a block diagram showing a configuration of a vehicle according to an embodiment.

FIG. 2 is a block diagram showing a configuration of a vehicle according to an embodiment.

Referring to FIG. 2, the vehicle 100 according to an embodiment may include a memory 110, a processor 120, a communication interface 130, a sensor unit 140, and a user interface 150. It will be appreciated by one of ordinary skill in a technical field related to the embodiment that other general-purpose components in addition to those shown in FIG. 2 may be further included in the vehicle 100.

The memory 110 may store software and/or a program. For example, the memory 110 may store a program and various kinds of data, such as an application, an application programming interface (API), etc. The memory 110 may store instructions that are executable by the processor 120.

The processor 120 may access data stored in the memory 110 to use the data, or may store new data in the memory 110. The processor 120 may execute the instructions stored in the memory 110. The processor 120 may execute a computer program installed in the vehicle 100. Also, the processor 120 may install a computer program or an application received from outside in the memory 110. The processor 120 may include at least one processing module. The processing module may be a dedicated processing module for executing a predetermined program. For example, the processor 120 may include various kinds of processing modules for executing a vehicle control program for autonomous driving, such as advanced driver assistance system (ADAS), or a processing module for executing a 3D space tracking program, in the form of separated, dedicated chips. The processor 120 may control other components included in the vehicle 100 to perform an operation corresponding to an instruction or an execution result of a computer program, etc.

The communication interface 130 may perform wireless communications with another device or a network. For this, the communication interface 130 may include a communication module that supports at least one of various wireless communication methods. For example, the communication interface 130 may include a communication module that performs short-range communication such as wireless fidelity (Wi-Fi), various kinds of mobile communication, such as 3G, 4G, and 5G, or ultra wideband communication. The communication interface 130 may be connected to a device installed outside the vehicle 100 to transmit and receive signals or data. The vehicle 100 may perform communication with the sensing device 200 or another vehicle through the communication interface 130, or may be connected to a local server managing a region where the vehicle 100 is located through the communication interface 130.

The sensor unit 140 may include at least one sensor for sensing a 3D space. The sensor unit 140 may sense an object located within a sensing range, and acquire data capable of generating coordinates of the sensed object on a 3D space. The sensor unit 140 may acquire shape data or distance data for the object located within the sensing range. The sensor unit 140 may include at least one among various kinds of sensors, such as a LiDAR sensor, a radar sensor, a camera sensor, an infrared imaging sensor, an ultrasonic sensor, etc. For example, the sensor unit 140 may include at least one 3D LiDAR sensor to acquire data for a space of a 360-degree range, and further include at least one selected from the group consisting of a radar sensor and an ultrasonic sensor to acquire data for a blind spot that the 3D LiDAR sensor may not sense or data for a near space within a predetermined distance from the vehicle 100.

The user interface 150 may receive a user input, etc. from a user. The user interface 150 may display information, such as an execution result of a computer program executed in the vehicle 100, a processing result corresponding to a user input, a state of the vehicle 100, etc. For example, a user may select a computer program that he/she wants to execute from among various kinds of computer programs installed in the vehicle 100, through the user interface 150, and execute the selected computer program. The user interface 150 may include hardware units for receiving inputs or providing outputs, and include a dedicated software module for driving the hardware units. For example, the user interface 150 may be a touch screen, although not limited thereto.

Although not shown in FIG. 2, the vehicle 100 may further include components required for autonomous driving, such as global positioning system (GPS), inertial measurement units (IMU), etc. The GPS is global positioning system that calculates a current location of the vehicle 100 by receiving signals transmitted from a GPS satellite. The IMU is an apparatus that measures the speed, direction, gravity, and acceleration of the vehicle 100. The processor 120 may acquire information related to a movement and position of the vehicle 100 by using the GPS and IMU. The processor 120 may acquire other information related to the control of the vehicle 100 from another sensor or memory included in the vehicle 100.

The processor 120 may execute a computer-executable instruction to acquire spatial information over time for a 3D space sensed successively by at least one sensor. The processor 120 may identify at least one object in the sensed 3D space by applying a neural network based object classification model to the acquired spatial information over time, and track the sensed 3D space including the identified at least object. The processor 120 may control driving of the vehicle 100, based on information related to the tracked 3D space and the information related to the movement and position of the vehicle 100. The information for the tracked 3D space may include spatial information about the space in which the identified at least one object is located and dynamic information about a movement of the identified at least one object.

The processor 120 may receive a time stamp in which time information is recorded and data for the sensed 3D space from the sensor unit 140, and create a 3D image corresponding to the spatial information over time for the sensed 3D space. Because the spatial information over time for the sensed 3D space may have movement coordinate values corresponding to a movement location of the vehicle 100 through the GPS, the spatial information over time for the sensed 3D space may be mapped to a corresponding part of coordinate system relative to predetermined coordinates, for example, absolute coordinate system relative to the origin point.

The sensor unit 140 may sense a 3D space successively and r within different sensing concentric ranges of a spherical shape through a plurality of 3D LiDAR sensors. The processor 120 may acquire spatial information over time for the 3D space sensed within the different sensing ranges, and assign an accuracy-related weight to an object commonly identified from the acquired spatial information over time to thereby track the 3D space.

The processor 120 may determine attribute information of at least one selected from the group consisting of a kind, 3D shape, location, position, size, trajectory, and speed of the at least one object identified in the sensed 3D space to track the 3D space, predict information related to the tracked 3D space, and control driving of the vehicle 100 further based on the predicted information.

The processor 120 may control driving of the vehicle 100 based on information related to the tracked 3D space and information related to a movement and position of the vehicle 100, changing according to a movement of the vehicle 100, at a processing speed of 10 Hz to 20 Hz and in real time.

The processor 120 may receive, from at least one sensing device 200 installed on a path along which the vehicle 100 travels, information related to a 3D space tracked by the sensing device 200 and corresponding to a fixed location of the sensing device 200, through the communication interface 130. The processor 120 may control driving of the vehicle 100 further based on the information related to the 3D space corresponding to the fixed location of the sensing device 200.

The processor 120 may use the neural network based object classification model to classify the identified at least one object into any one of an object of a first type corresponding to a vehicle of a predetermined level or higher, an object of a second type corresponding to a two-wheeled vehicle or a small vehicle that is lower than the predetermined level, an object of a third type corresponding to a pedestrian, an object of a fourth type corresponding to a traveling path of the vehicle 100, and an object of a fifth type corresponding to another sensed object except for the objects of the first to fourth types. The processor 120 may distinctively display the classified at least one object in the tracked 3D space through the user interface 150.

Figure 3:
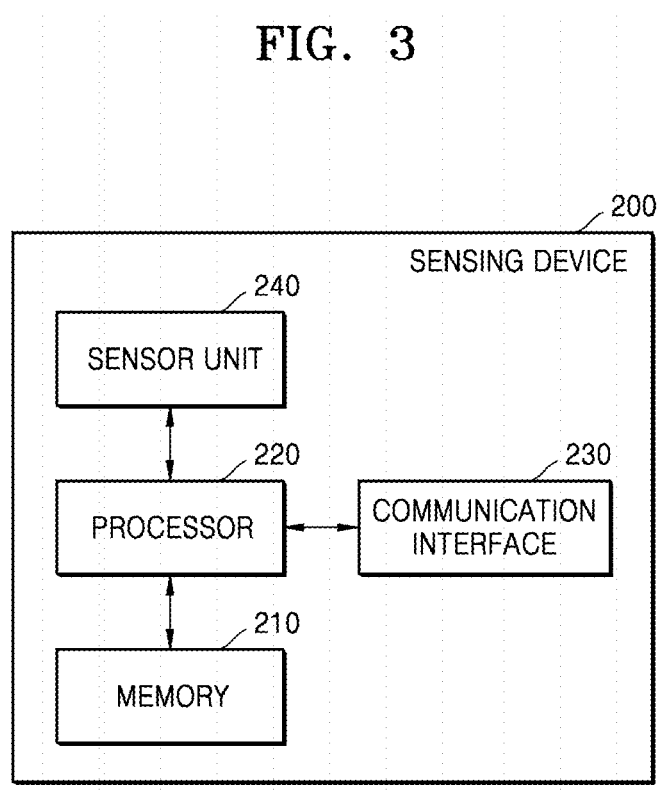
FIG. 3 is a block diagram showing a configuration of a sensing device according to an embodiment.

FIG. 3 is a block diagram showing a configuration of the sensing device 200 according to an embodiment.

Referring to FIG. 3, the sensing device 200 according to an embodiment may include a memory 210, a processor 220, a communication interface 230, and a sensor unit 240. It will be appreciated by one of ordinary skill in a technical field related to the embodiment that other general-purpose components in addition to those shown in FIG. 3 may be further included in the sensing device 200.

The memory 210 may store software and/or a program. The memory 110 may store instructions that are executable by the processor 220.

The processor 220 may access data stored in the memory 210 to use the data, or may store new data in the memory 210. The processor 220 may execute the instructions stored in the memory 210. The processor 220 may execute a computer program installed in the sensing device 200. Also, the processor 220 may install a computer program or an application received from outside in the memory 210. The processor 220 may include at least one processing module.

For example, the processor 220 may include a processing module for executing a 3D space tracking program in the form of a dedicated processing module. The processor 220 may control other components included in the sensing device 200 to perform an operation corresponding to an instruction or an execution result of a computer program, etc.

The communication interface 230 may perform wired or wireless communication with another device or a network. For this, the communication interface 230 may include a communication module that supports at least one of various wired or wireless communication methods. For example, the communication interface 230 may include a communication module that performs short-range communication such as Wi-Fi, wireless communication such as various kinds of mobile communication, or wired communication using a coaxial cable, an optical fiber cable, etc. The communication interface 230 may be connected to a device installed outside the sensing device 200 to transmit and receive signals or data. The sensing device 200 may perform communication with the vehicle 100 or another sensing device through the communication interface 230, or may be connected to a local server managing a region where the sensing device 200 is located through the communication interface 230.

The sensor unit 240 may include at least one sensor for sensing a 3D space. The sensor unit 240 may sense an object located within a sensing range, and acquire data capable of generating coordinates of the sensed object on a 3D space. The sensor unit 240 may acquire shape data or distance data for the object located within the sensing range. The sensor unit 240 may include at least one among various kinds of sensors, such as a LiDAR sensor, a radar sensor, a camera sensor, an infrared imaging sensor, an ultrasonic sensor, etc. For example, the sensor unit 240 may include at least one 3D LiDAR sensor to acquire data for a space of a 360-degree range, and further include at least one selected from the group consisting of a radar sensor and an ultrasonic sensor to acquire data for a blind spot that the 3D LiDAR sensor may not sense or data for a near space within a predetermined distance from the sensing device 200.

The processor 220 may execute a computer-executable instruction to acquire spatial information over time for a 3D space sensed successively by at least one sensor. The processor 220 may identify at least one object in the sensed 3D space by applying a neural network based object classification model to the acquired spatial information over time, and track the sensed 3D space including the identified at least object. The processor 220 may transmit information related to the tracked 3D space to outside through the communication interface 230.

The processor 220 may receive a time stamp in which time information is recorded and data for the sensed 3D space from the sensor unit 240, and create a 3D space corresponding to the spatial information over time for the sensed 3D space. Because the spatial information over time for the sensed 3D space may have fixed coordinate values corresponding to a fixed location of the sensing device 200, the spatial information over time for the sensed 3D space may be mapped to a corresponding part of coordinate system relative to predetermined coordinates, for example, absolute coordinate system relative to the origin point.

The processor 220 may determine attribute information of at least one selected from the group consisting of a kind, 3D shape, location, position, size, trajectory, and speed of the at least one object identified in the sensed 3D space to track the 3D space. The processor 220 may transmit information related to the tracked 3D space to at least one of selected from the group consisting a vehicle 100, another sensing device 200, and a server 300, which is within a predetermined distance from the sensing device 200, through the communication interface 230.

Figure 4:
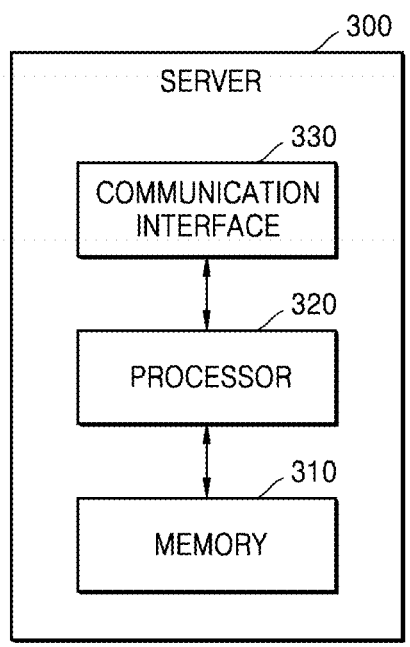
FIG. 4 is a block diagram showing a configuration of a server according to an embodiment.

FIG. 4 is a block diagram showing a configuration of the server 300 according to an embodiment of the disclosure.

Referring to FIG. 4, the server 300 according to an embodiment may include a memory 310, a processor 320, and a communication interface 330. It will be appreciated by one of ordinary skill in a technical field related to the embodiment that other general-purpose components in addition to those shown in FIG. 4 may be further included in the server 300.

The memory 310 may store software and/or a program. The memory 30 may store instructions that are executable by the processor 320.

The processor 30 may use data stored in the memory 310, or may store new data in the memory 310. The processor 320 may execute the instructions stored in the memory 310. The processor 320 may execute a computer program installed in the server 300. The processor 320 may include at least one processing module. The processor 320 may control other components included in the server 300 to perform an operation corresponding to an instruction or an execution result of a computer program, etc.

The communication interface 330 may perform wired or wireless communication with another device or a network. The communication interface 330 may be connected to a device located outside the server 300 to transmit and receive signals or data. The server 300 may perform communication with the vehicle 100 or the sensing device 200 through the communication interface 330, or may be connected to another server connected through a network.

The processor 320 may execute a computer executable instruction to receive information related to a 3D space tracked by at least one vehicle 100 and corresponding to a movement location of the vehicle 100, through the communication interface 330, and to receive information related to a 3D space tracked by at least one sensing device 200 installed on a path along which the vehicle 100 travels and corresponding to a fixed location of the sensing device 200, through the communication interface 330. The processor 320 may reconstruct information related to a 3D space corresponding to a predetermined region to which both the movement location of the vehicle 100 and the fixed location of the sensing device 200 belong, based on the information related to the 3D space corresponding to the movement location of the vehicle 100 and the information related to the 3D space corresponding to the fixed location of the sensing device 200.

The processor 320 may transmit the reconstructed information related to the 3D space corresponding to the predetermined region to an integrated server of an upper layer through the communication interface 330.

Figure 5:
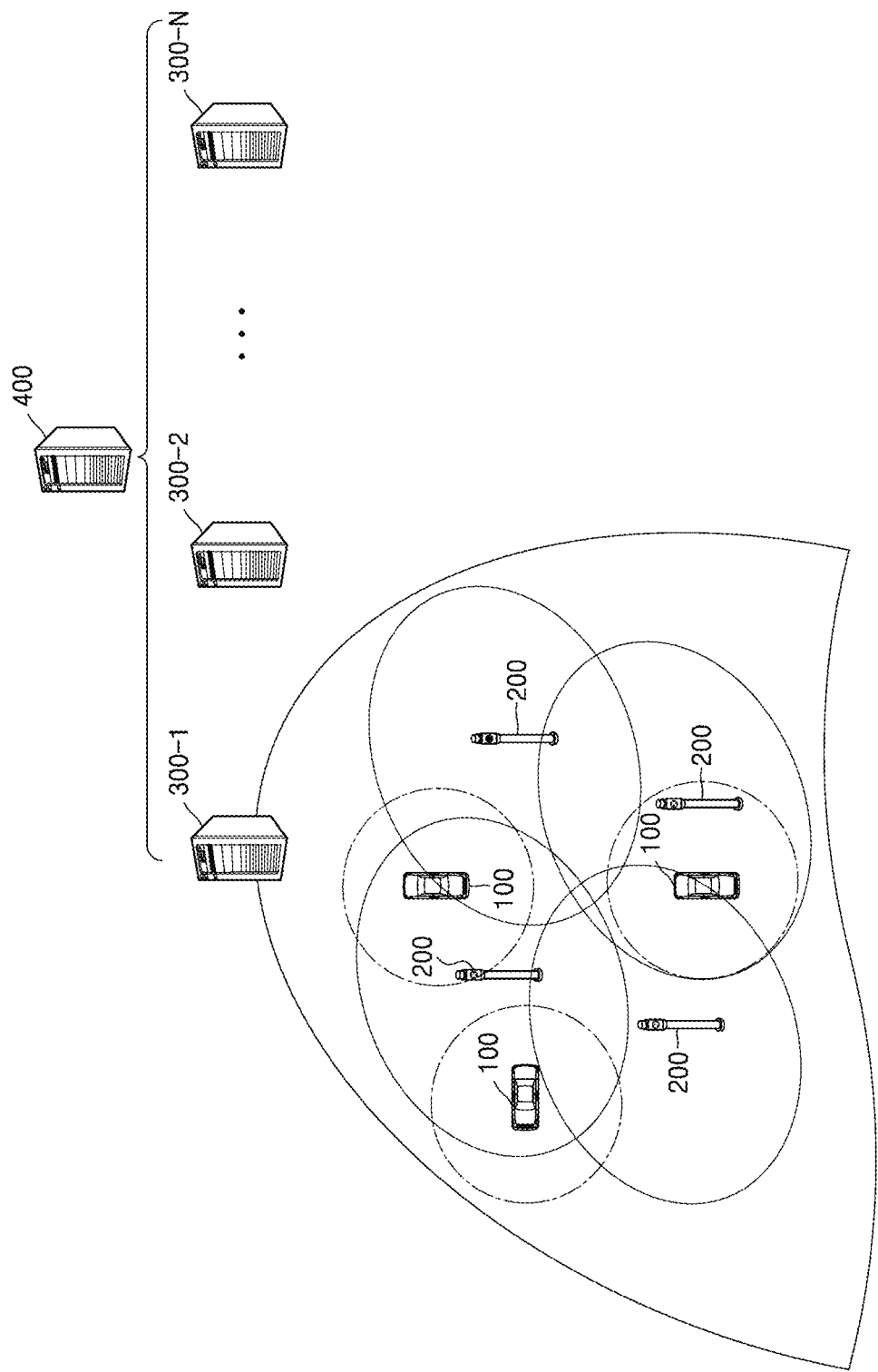
FIG. 5 illustrates a hierarchical structure of servers according to an embodiment.

FIG. 5 is illustrates a hierarchical structure of servers (300-1 to 300-N and 400) according to an embodiment.

Referring to FIG. 5, all sensing ranges of the vehicle 100 and the sensing device 200 belong to a predetermined region. The predetermined region may be managed by any one server 300 among servers (300-1, 300-2, . . . , 300-N, hereinafter, representatively indicated by 300) which are local servers.

The server 300 may collect information related to a 3D space tracked by the vehicle 100 or the sensing device 200 within the region which the server 300 manages, and map the information to a corresponding space in the region to thereby reconstruct information related to a 3D space corresponding to the entire region. In other words, the server 300 corresponding to a local server may acquire information related to a 3D space for a region which itself manages. When a predetermined criterion is satisfied or a request is received, the server 300 corresponding to a local server may transmit the entire or a part of the information related to the 3D space for the region which itself manages to the vehicle 100 or the sensing device 200 located in the region. Also, the server 300 may transmit the information related to the 3D space for the region which itself manages to a server 400 corresponding to a global server managing the local servers. The server 400 may be an integrated server of an upper layer of the server 300.

The server 400 may collect the information related to the 3D space corresponding to the predetermined region reconstructed by the local servers, and map the information to a corresponding space in a global region to thereby acquire information related to a 3D space corresponding to the global region which the server 400 manages. In other words, the server 400 corresponding to the global server may acquire the information related to the 3D space for the global region which itself manages. When a predetermined criterion is satisfied or a request is received, the server 400 corresponding to a global server may transmit the entire or a part of the information related to the 3D space for the global region which itself manages to the server 300 corresponding to a local server.

As shown in FIG. 5, a hierarchical structure is formed between the vehicle 100 including the sensor unit 140, the sensing device 200 including the sensor unit 240, the server 300 corresponding to a local server, and the server 400 corresponding to a global server. The information related to the 3D space tracked by the vehicle 100 and the sensing device 200 may be transferred to the upper layer and integrated to become information related to a 3D space corresponding to an entire space.

Figure 6:
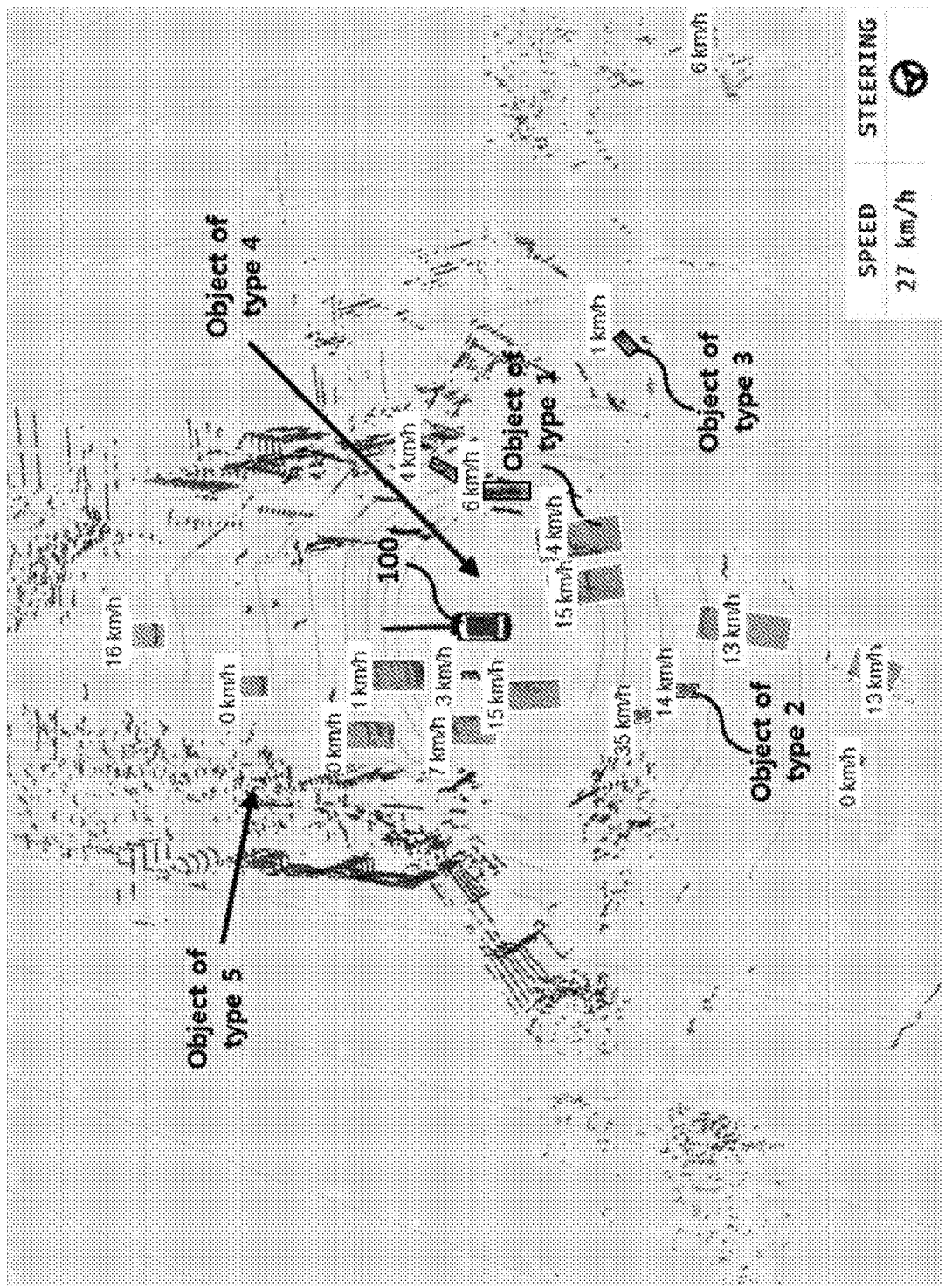
FIG. 6 is a view for describing a state in which a vehicle according to an embodiment travels based on information related to a tracked three-dimensional (3D) space.

FIG. 6 is a view for describing a state in which the vehicle 100 according to an embodiment travels based on information related to a tracked 3D space.

Referring to FIG. 6, the vehicle 100 travels based on information related to a 3D space corresponding to a movement location of the vehicle 100 and information related to a movement and position of the vehicle 100. The information related to the 3D space corresponding to the movement location of the vehicle 100 may include at least one object. As shown in FIG. 6, a vehicle of a predetermined level or higher may be classified into an object of a first type, a two-wheeled vehicle or a small vehicle that is lower than the predetermined level may be classified into an object of a second type, a pedestrian may be classified into an object of a third type, a traveling path of the vehicle 100 may be classified into an object of a fourth type, and another sensed object except for the objects of the first to fourth types may be classified into an object of a fifth type. The objects of the respective types may have different 3D shapes including heights, different sizes, different colors, etc. Locations, positions, speeds, etc. of the individual objects may be determined based on information related to a 3D space tracked according to a movement location of the vehicle 100, and by continuing to track the objects, displacements, change amounts, trajectories, courses, etc. may be checked or predicted. When the vehicle 100 is an autonomous vehicle, surrounding objects changing according to a movement of the vehicle 100 may be tracked to be used as data for controlling driving of the vehicle 100.

As shown in the right, lower area of FIG. 6, a speed and direction of the vehicle 100 and an angle of steering system may be checked, and changes of the speed and direction of the vehicle 100 and the angle of the steering system according to a movement of the vehicle 100 may be tracked.

Figure 7:
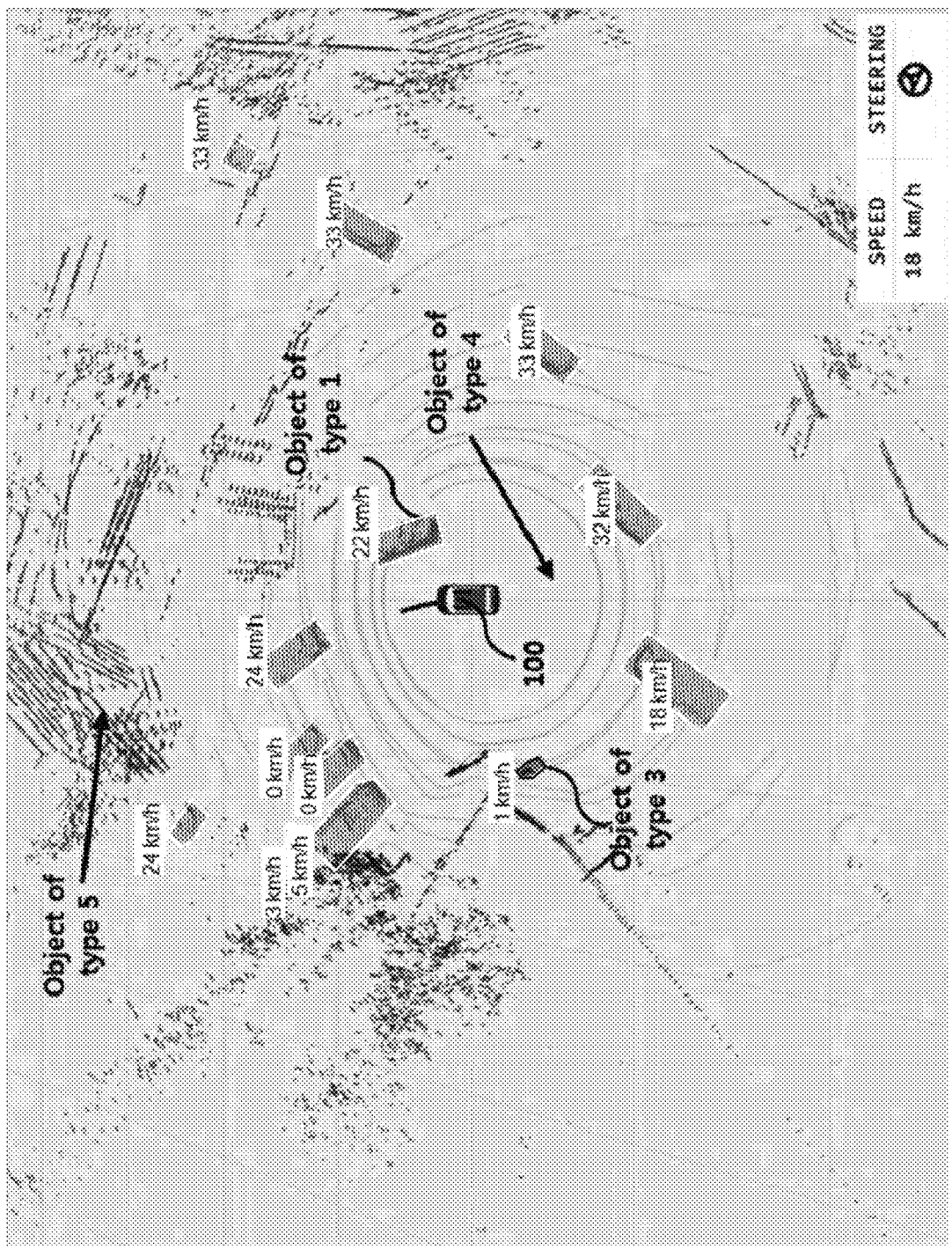
FIG. 7 is a view for describing a state in which a vehicle according to another embodiment travels based on information related to a tracked 3D space.

FIG. 7 is a view for describing a state in which a vehicle 100 according to another embodiment travels based on information related to a tracked 3D space.

Referring to FIG. 7, the vehicle 100 travels based on information related to a 3D space corresponding to a movement location of the vehicle 100 and information related to a movement and position of the vehicle 100. Comparing FIG. 7 to FIG. 6, differences in number and interval of concentric circles surrounding the vehicle 100 are found. In the case of FIG. 7, the vehicle 100 may sense a 3D space successively and respectively within different sensing concentric ranges of a spherical shape through a plurality of 3D LiDAR sensors, and acquire spatial information over time for the 3D space sensed within the different sensing ranges to track a 3D space corresponding to a movement location of the vehicle 100.

Figure 8:
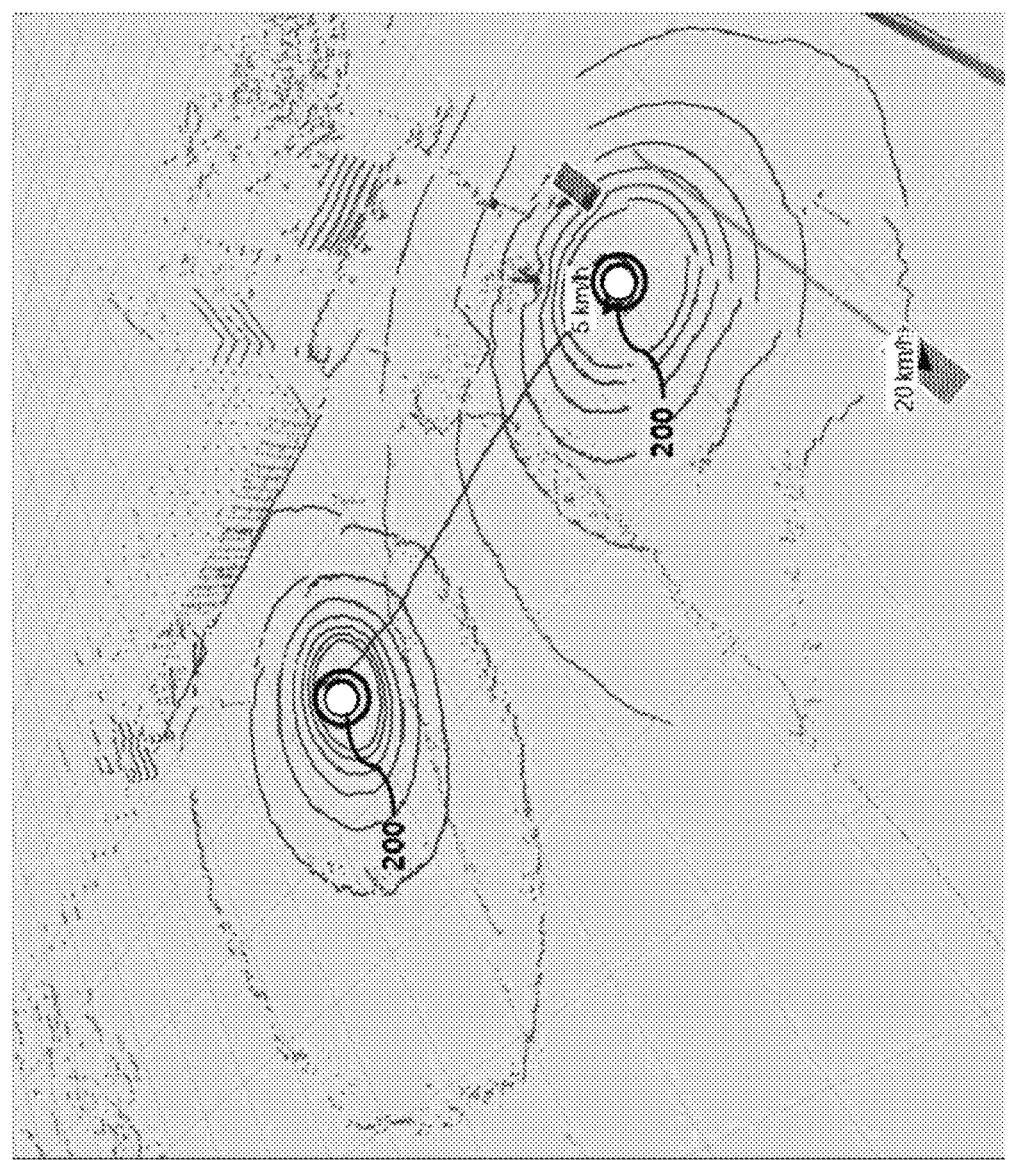
FIG. 8 is a view for describing a state in which a sensing device according to an embodiment tracks information related to a 3D space corresponding to its fixed location.

FIG. 8 is a view for describing a state in which the sensing device 200 according to an embodiment tracks information related to a 3D space corresponding to its fixed location.

Referring to FIG. 8, two sensing devices 200 may be located with a predetermined distance, and each of the sensing devices 200 may sense a 3D space successively by at least one sensor to track information related to a 3D space corresponding to a fixed location of the sensing device 200. It is seen that a vehicle corresponding to ID 185 moves at a speed of about 20 km/h away from the sensing devices 200, and a pedestrian corresponding to ID 156 moves at a speed of about 5 km/h from the sensing device 200 located to the left to the sensing device 200 located to the right. In this case, to inform movement directions of the objects, arrows corresponding to the movement directions of the objects may be provided. Because the sensing devices 200 determine what object passes through or invades the sensing ranges, the sensing devices 200 may be used for a security purpose and for a monitoring purpose such as traffic observation for a predetermined region.

Figure 9:
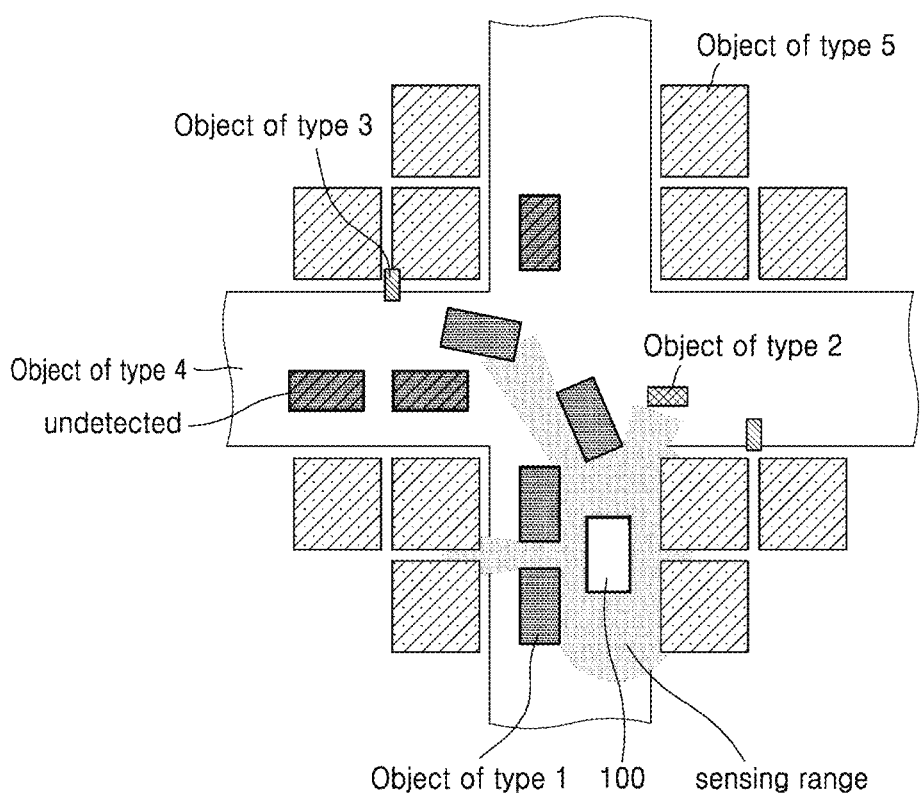
FIG. 9 is a view for describing a state in which a vehicle according to an embodiment travels based on information related to a 3D space tracked by the vehicle and corresponding to a movement location of the vehicle.
Figure 10:
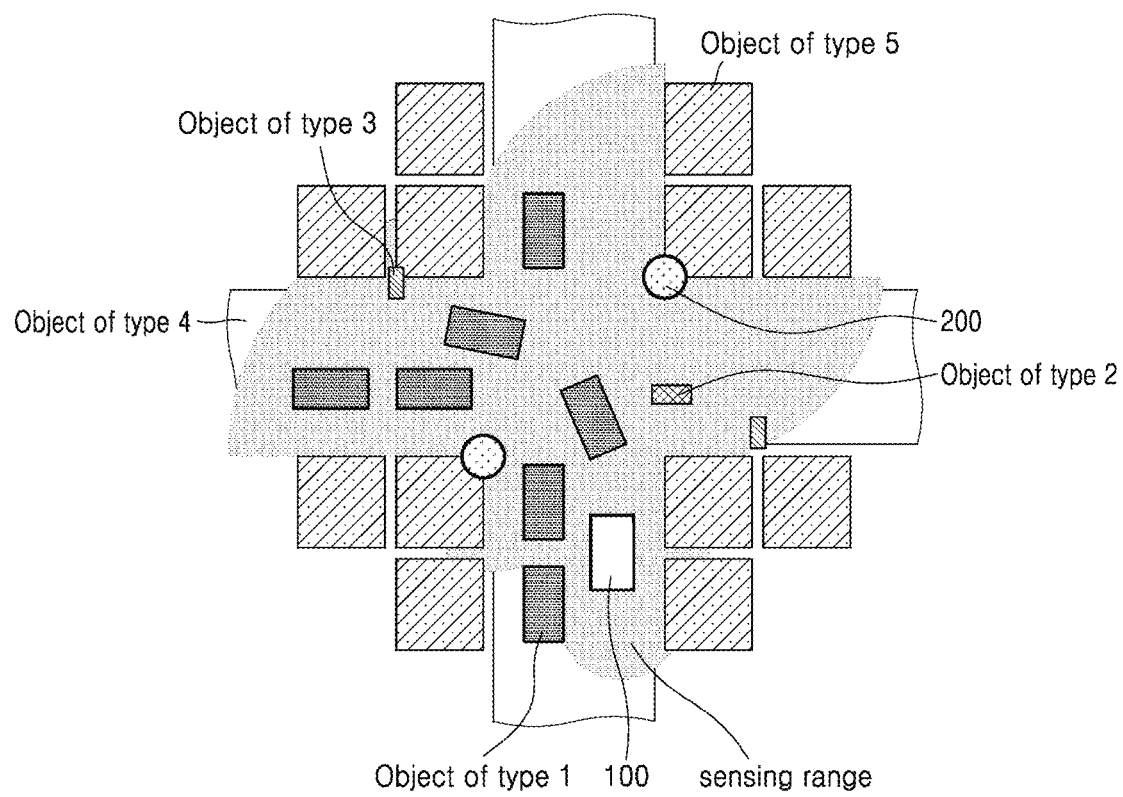
FIG. 10 is a view for describing a state in which a vehicle according to an embodiment travels based on information related to a 3D space tracked by the vehicle and corresponding to a movement location of the vehicle and information related to a 3D space tracked by a sensing device and corresponding to a fixed location of the sensing device.

FIG. 9 is a view for describing a state in which the vehicle 100 according to an embodiment travels based on information related to a 3D space tracked by the vehicle 100 and corresponding to a movement location of the vehicle 100. FIG. 10 is a view for describing a state in which the vehicle 100 according to an embodiment travels based on information related to a 3D space tracked by the vehicle 100 and corresponding to a movement location of the vehicle 100 and information related to a 3D space tracked by the sensing device 200 and corresponding to a fixed location of the sensing device 200.

Referring to FIGS. 9 and 10, because the vehicle 100 shown in FIG. 9 uses a sensor included therein to acquire information related to a 3D space corresponding to a movement location of the vehicle 100, a sensing range of the sensor may be limited when there are objects surrounding the vehicle 100. In contrast, because the vehicle 100 shown in FIG. 10 acquires, by using a sensor included in at least one sensing device 200 installed on a path along which the vehicle 100 travels, information related to a 3D space corresponding to a fixed location of the sensing device 200, as well as acquiring information related to a 3D space corresponding to a movement location of the vehicle 100 by using the sensor included in the vehicle 100, a 3D space that may be sensed by the vehicle 100 of FIG. 10 may be significantly wider than a 3D space that may be sensed by the vehicle 100 of FIG. 9. The vehicle 100 of FIG. 10 may track a pedestrian corresponding to the object of the third type and all kinds of vehicles corresponding to the object of the first type and check information about the pedestrian and vehicles, whereas the vehicle 100 of FIG. 9 may not track a pedestrian corresponding to the object of the third type and some kinds of vehicles corresponding to the object of the first type.

Figure 11:
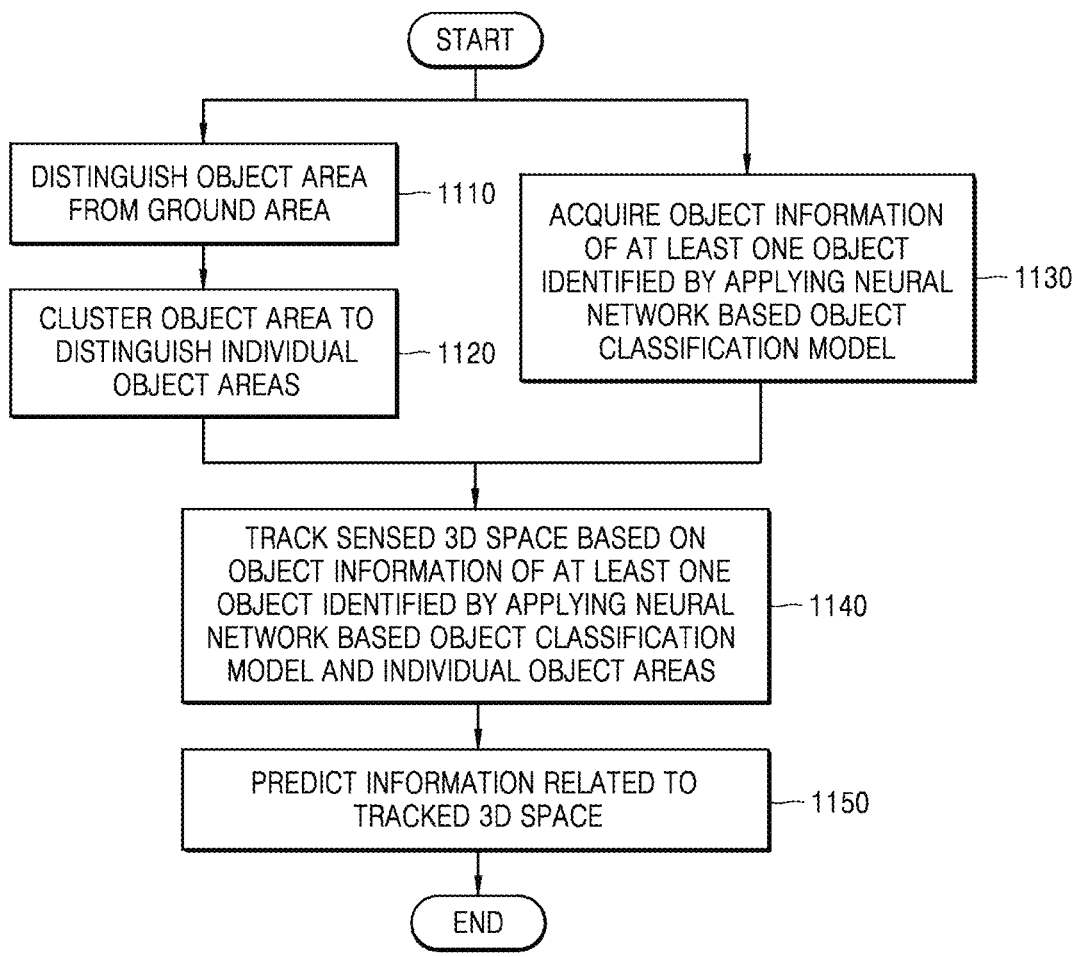
FIG. 11 is a flowchart for describing a process of tracking a sensed 3D space based on spatial information over time for the 3D space and predicting information related to the tracked 3D space.

FIG. 11 is a flowchart for describing a process of tracking a sensed 3D space based on spatial information over time for the 3D space and predicting information related to the tracked 3D space. FIGS. 12 to 16 are views for describing operations of a process of tracking a sensed 3D space based on spatial information over time for the 3D space and predicting information related to the tracked 3D space. Hereinafter, a process of tracking a sensed 3D space based on spatial information over time for the 3D space and predicting information related to the tracked 3D space will be described with reference to FIGS. 11 to 16.

In operation 1110, the vehicle 100 or the sensing device 200 may distinguish an object area from a ground area based on spatial information over time for a 3D space. The spatial information over time for the 3D space sensed by the vehicle 100 or the sensing device 200 may be in the form of point cloud data.

The vehicle 100 or the sensing device 200 may distinguish the ground area from the spatial information over time for the 3D space. The vehicle 100 or the sensing device 200 may distinguish point cloud data corresponding to the ground area among the point cloud data. The vehicle 100 or the sensing device 200 may first distinguish the ground area from the spatial information over time for the 3D space, and then distinguish the remaining area as the object area including at least one object. The vehicle 100 or the sensing device 200 may apply fitting based on a stochastic model to find a ground estimation model. The vehicle 100 or the sensing device 200 may train a ground shape in real time, and distinguish the ground area depending on whether or not each point cloud data is point cloud data corresponding to the ground area.

Figure 12:
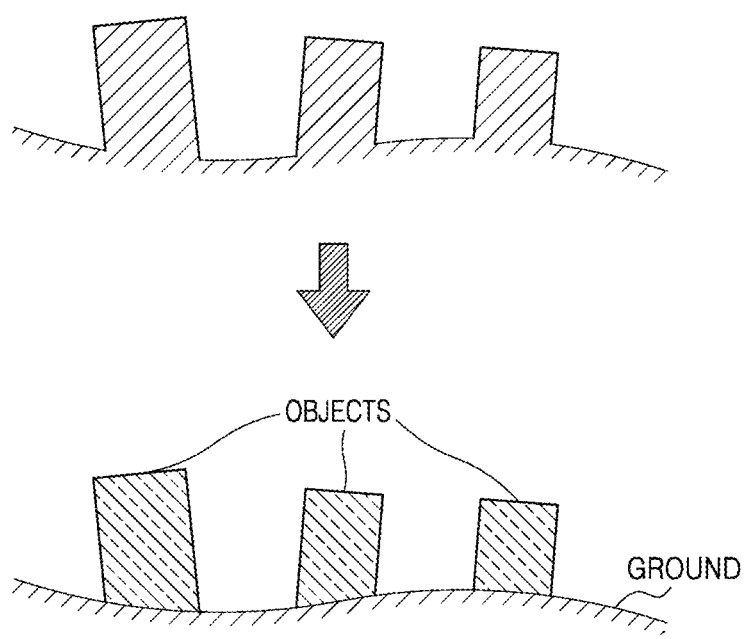
FIGS. 12 to 16 are views for describing operations of a process of tracking a sensed 3D space based on spatial information over time for the 3D space and predicting information related to the tracked 3D space.

In FIG. 12, a process of distinguishing an object area from a ground area based on spatial information at a predetermined time for a 3D space sensed by the vehicle 100 or the sensing device 200 is shown. For convenience of description, as shown in FIGS. 12 to 16, a case in which spatial information includes three objects and a ground will be described as an example.

Spatial information at a predetermined time for a 3D space sensed by the vehicle 100 or the sensing device 200 may be, as shown in the upper area of FIG. 12, point cloud data in which objects are not distinguished from a ground, and may be point cloud data corresponding to all sensed things. The vehicle 100 or the sensing device 200 may separate point cloud data estimated to correspond to a ground area from the entire point cloud data, as shown in the upper part of FIG. 12, thereby distinguishing point cloud data corresponding to an object area from point cloud data corresponding to the ground area, as shown in the lower area of FIG. 12. Herein, the object area may include one or more objects. The object area may be point cloud data corresponding to the entire objects that are not distinguished from each other.

Referring again to FIG. 11, in operation 1120, the vehicle 100 or the sensing device 200 may cluster the object area to distinguish individual object areas. The vehicle 100 or the sensing device 200 may distinguish the individual object areas in order to distinguish the object area distinguished from the ground area according to objects. Because the object area distinguished from the ground area is point cloud data corresponding to the entire objects, the vehicle 100 or the sensing device 200 may cluster the point cloud data corresponding to the entire objects to thereby distinguish point cloud data for each object.

Figure 13:
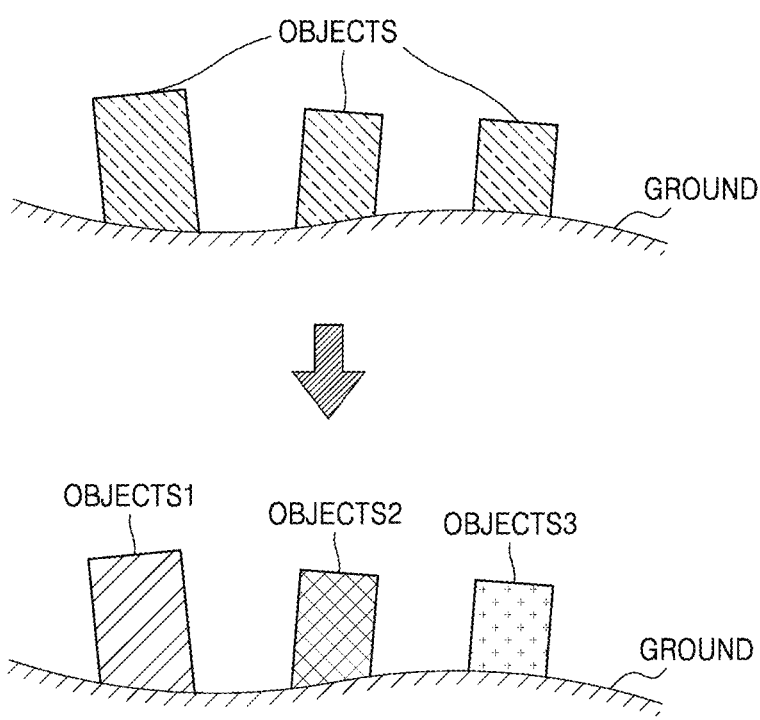

In FIG. 13, a process in which the vehicle 100 or the sensing device 200 distinguishes the individual object areas corresponding to the respective objects from the object area distinguished from the ground area is shown.

As shown in the upper area of FIG. 13, the point cloud data corresponding to the object area including the entire objects except for the ground may be distinguished from the point cloud data corresponding to the ground area. The vehicle 100 or the sensing device 200 may cluster the point cloud data corresponding to the object area based on at least one selected from the group consisting of distance information, shape information, and distribution information to thereby distinguish point cloud data corresponding to individual object areas of 'object 1', 'object 2', and 'object 3' from the point cloud data corresponding to the object area including the entire objects, as shown in the lower area of FIG. 13. As a result, the vehicle 100 or the sensing device 200 may acquire information about locations, shapes, and numbers of the objects.

Referring again to FIG. 11, in operation 1130, the vehicle 100 or the sensing device 200 may acquire object information of at least one object identified by applying a neural network based object classification model to spatial information over time for a 3D space. The vehicle 100 or the sensing device 200 may input the spatial information over time for the 3D space to the neural network based object classification model to identify at least one object, and acquire object information of the identified object. The neural network based object classification model may have been trained by using a training image databased for each object. The neural network based object classification model may estimate object information of each object identified based on at least one of distance information, shape information, and distribution information, for point cloud data corresponding to all sensed things. The vehicle 100 or the sensing device 200 may identify a movable object of interest, such as a vehicle, a small vehicle, a two-wheeled vehicle, a pedestrian, etc., through the neural network based object classification model, to estimate object information for the object of interest. Operation 1130 may be performed in parallel to operations 1110 and 1120.

Figure 14:
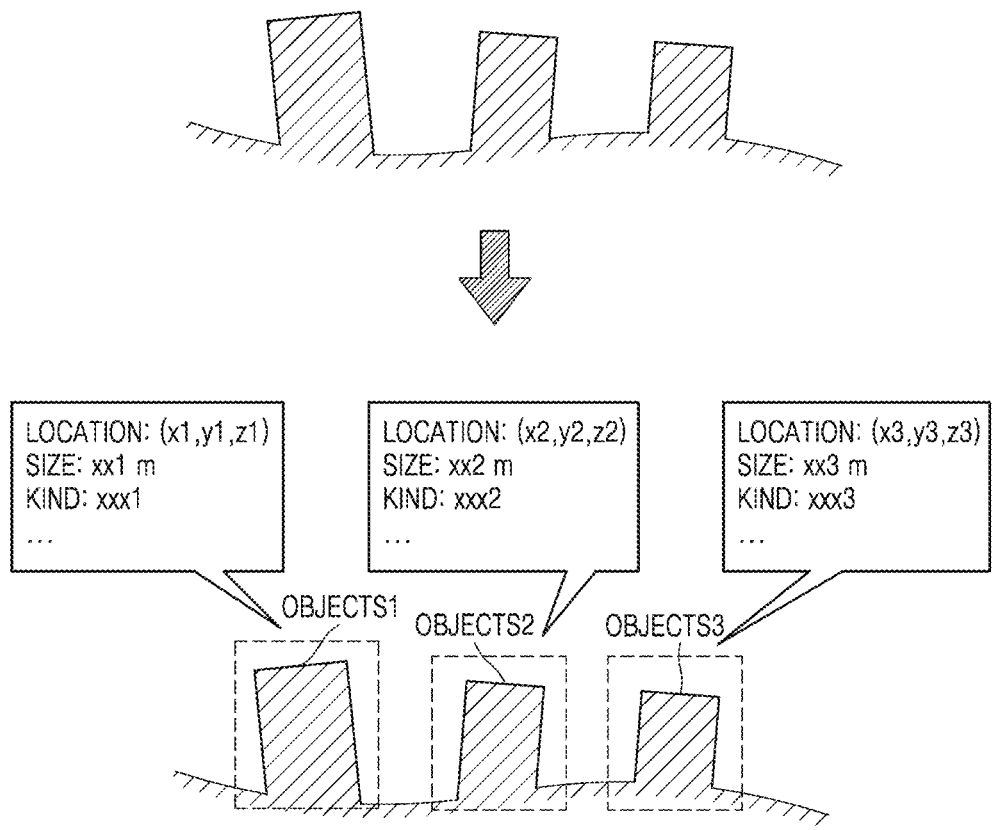

In FIG. 14, a process of acquiring object information of each object from spatial information at a predetermined time for a 3D space sensed by the vehicle 100 or the sensing device 200 is shown.

The spatial information at the predetermined time for the 3D space sensed by the vehicle 100 or the sensing device 200 may be point cloud data corresponding to all sensed things, as shown in the upper area of FIG. 14. The vehicle 100 or the sensing device 200 may identify and classify 'object 1', 'object 2', and 'object 3' and acquire object information of 'object 1', 'object 2', and 'object 3' by applying the neural network based object classification model to the entire point cloud data, as shown in the upper area of FIG. 14. By setting an object of a type corresponding to 'object 1' to an object of interest in advance, the vehicle 100 or the sensing device 200 may identify and classify 'object 1' set to an object of interest to acquire object information for 'object 1'. As shown in the lower area of FIG. 14, the vehicle 100 or the sensing device 200 may estimate a kind, location, and size value of each object, and determine various shapes of boundary lines or bounding boxes for the objects.

Referring again to FIG. 11, in operation 1140, the vehicle 100 or the sensing device 200 may track the sensed 3D space, based on the object information of the at least one object identified by applying the neural network based object classification model to the spatial information over time for the 3D space, the object information acquired in operation 1130, and the individual object areas acquired in operation 1120. The neural network based object classification model applied in operation 1130 may have difficulties in identifying an object that has not sufficiently been trained and estimating object information of the object. Therefore, the vehicle 100 or the sensing device 200 may acquire information related to a location, shape, number, etc. of an object that may not be identified, from the individual object areas acquired in operation 1120. Also, the information of the object estimated by the neural network based object classification model applied in operation 1130 may be different from actual information of the object on the sensed 3D space. Therefore, the vehicle 100 or the sensing device 200 may correct the information of the object by using the information related to the location, shape, number, etc. of the object, which may be acquired from the individual object areas acquired in operation 1120. As a result, the information of the object estimated by the neural network based object classification model may be integrated with the information related to each object acquired from the individual object areas distinguished through clustering to identify the object and to acquire correct information related to the location, shape, etc. of the object. Also, an object that may be not identified or distinguished through the neural network based object classification model may be identified by using the information related to the object acquired from the individual object areas distinguished through clustering, so that all objects on the sensed 3D space may be tracked without being missed.

Figure 15:
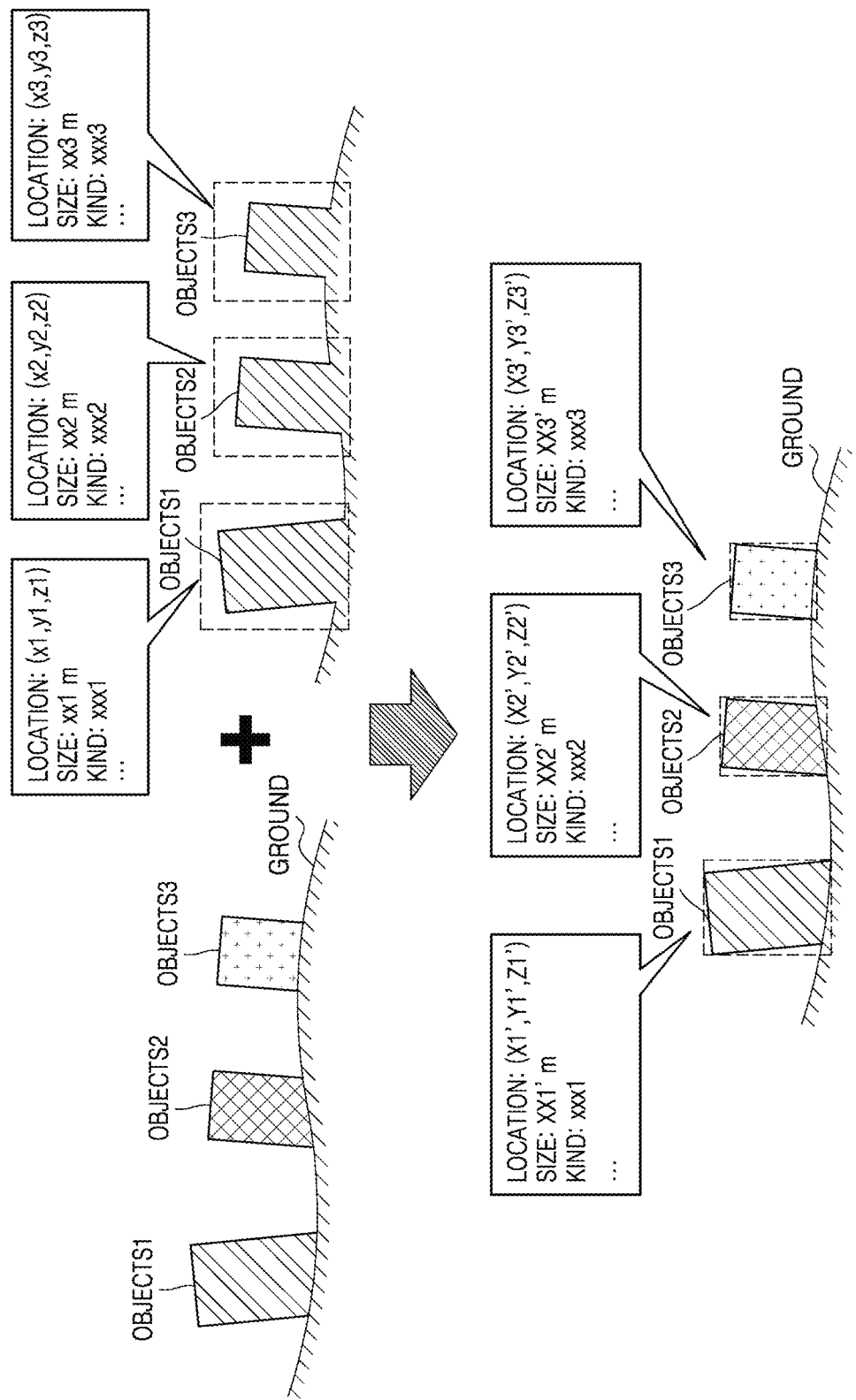
Figure 16:
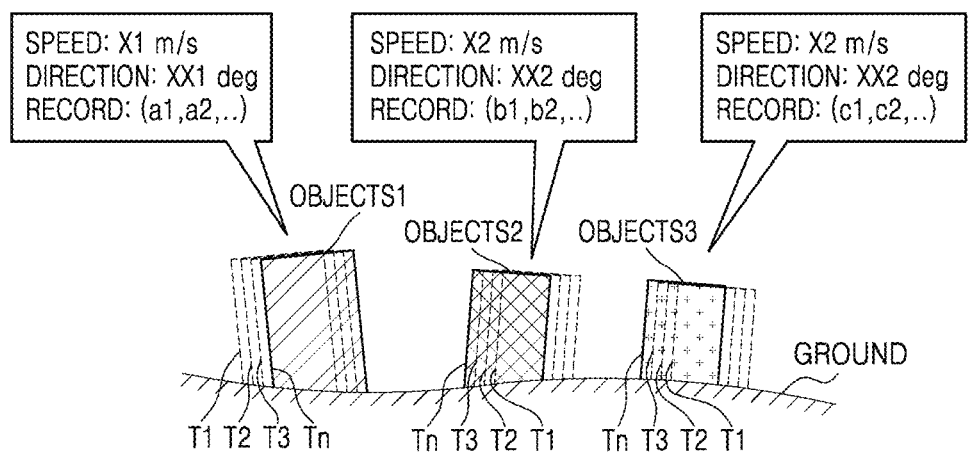

In FIGS. 15 and 16, a process of integrating information related to an object acquired from the individual object areas distinguished through clustering by the vehicle 100 or the sensing device 200 with information of the object estimated by the neural network based object classification model to track the object on the sensed 3D space is shown.

Referring to FIG. 15, the vehicle 100 or the sensing device 200 may integrate information related to individual objects of 'object 1', 'object 2', and 'object 3' acquired based on point cloud data corresponding to the individual object areas with object information of the individual objects identified as and classified into 'object 1', 'object 2', and 'object 3' to acquire correct information for all objects on the sensed 3D space. The vehicle 100 or the sensing device 200 may correct various shapes of boundary lines or bounding boxes for the individual objects according to information about the individual objects acquired based on point cloud data corresponding to the individual object areas to acquire correct information about the objects.

Referring to FIG. 16, the vehicle 100 or the sensing device 200 may acquire continuous information for all objects on the sensed 3D space, over time, from spatial information over time for the sensed 3D space, to track all the objects on the sensed 3D space. For example, the vehicle 100 or the sensing device 200 may track each object over time according to an object tracking method using a Kalman filter. As shown in FIG. 16, the vehicle 100 or the sensing device 200 may track a speed and movement direction of each object based on a change amount in location of the object, from continuous frame information over time, and record the tracked result.

Referring again to FIG. 11, in operation 1150, the vehicle 100 or the sensing device 200 may predict information related to the tracked 3D space. The vehicle 100 or the sensing device 200 may accumulate the tracked information of the object, and analyse a movement pattern of the object from the accumulated tracked information to predict a movement of the object. The vehicle 100 or the sensing device 200 may predict a movement of an object of interest among at least one object identified on the tracked 3D space to reduce a computation amount of related processing, thereby planning efficient driving or monitoring.

Each of the above-described embodiments may be provided in the form of a computer program or an application stored in a computer readable storage medium to perform a method, in an electronic device, including predetermined operations using spatial information acquired by using a sensor. In other words, each of the above-described embodiments may be provided in the form of a computer program or an application stored in a computer readable storage medium to enable an electronic device to execute a method including predetermined operations using spatial information acquired by using a sensor.

The above-described embodiments may be implemented in the form of a computer readable storage medium that stores instructions and data executable by a computer or a processor. At least one of the instructions and data may be stored in the form of program codes, and when executed by the processor, the instructions or data may generate a predetermined program module to perform a predetermined operation. The computer readable storage medium may be read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, a magnetic tape, a floppy disk, an optical-magnetic data storage device, an optical data storage device, a hard disk, a solid-state disk (SSD), or any device capable of storing instructions or software, related data, data files, and data structures and providing instructions or software, related data, data files, and data structures to a processor or a computer for the processor or computer to execute instructions.

While the present disclosure has been particularly shown and described with reference to embodiments thereof, it will be understood by one of ordinary skill in the art that various changes in form and details may be made therein without departing from the scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

What is claimed is:

1. A vehicle comprising:
a sensor unit configured to successively sense a three-dimensional (3D) space by using at least one sensor;
a memory storing a computer executable instruction; and
a processor configured to execute the computer executable instruction to acquire spatial information over time for the sensed 3D space, identify at least one object in the sensed 3D space by applying a neural network based object classification model to the acquired spatial information over time, track the sensed 3D space including the identified at least one object, and control driving of the vehicle based on information related to the tracked 3D space and information related to a movement and position of the vehicle, wherein the processor is further configured to determine individual object areas from the acquired spatial information over time, determine object information of the at least one object identified by applying the neural network based object classification model to the acquired spatial information over time, and track the sensed 3D space based on the object information and the individual object areas.

2. The vehicle of claim 1, wherein the sensor unit comprises at least one 3D light detection and ranging (LiDAR) sensor configured to acquire data for a space of a 360-degree range, and at least one selected from the group consisting of a radar sensor and an ultrasonic sensor configured to acquire data for a blind spot that the 3D LiDAR sensor fails to sense or data for a near space within a predetermined distance from the vehicle.

3. The vehicle of claim 1, wherein the sensor unit is further configured to successively sense through a plurality of 3D light detection and ranging (LiDAR) sensors the 3D space respectively within different sensing concentric ranges of a spherical shape, and wherein the processor is further configured to acquire spatial information over time for the 3D space sensed within different sensing ranges, and assign an accuracy-related weight to an object commonly identified from the acquired spatial information over time to thereby track the 3D space.

4. The vehicle of claim 1, wherein the processor is further configured to determine attribute information of at least one selected from the group consisting of a kind, 3D shape, location, position, size, trajectory, and speed of the at least one object identified in the sensed 3D space to track the 3D space, predict information related to the tracked 3D space, and control driving of the vehicle further based on the predicted information.

5. The vehicle of claim 1, wherein the processor is further configured to control driving of the vehicle based on the information related to the tracked 3D space and the information related to the movement and position of the vehicle, that changes according to a movement of the vehicle, at a processing speed of 10 Hz to 20 Hz and in real time.

6. The vehicle of claim 1, wherein the processor is further configured to receive, from the sensor unit, a time stamp in which time information is recorded and data about the sensed 3D space, and create a 3D image corresponding to the spatial information over time for the sensed 3D space.

7. The vehicle of claim 1, further comprising a communication interface configured to receive, from at least one sensing device installed on a path along which the vehicle travels, information related to a 3D space tracked by the at least one sensing device and corresponding to a fixed location of the at least one sensing device.

8. The vehicle of claim 7, wherein the processor is further configured to control driving of the vehicle further based on the received information related to the 3D space corresponding to the fixed location of the at least one sensing device.

9. The vehicle of claim 1, wherein the processor is further configured to use the neural network based object classification model to classify the identified at least one object into any one of an object of a first type corresponding to a vehicle of a predetermined level or higher, an object of a second type corresponding to a two-wheeled vehicle or a small vehicle that is lower than the predetermined level, an object of a third type corresponding to a pedestrian, an object of a fourth type corresponding to a traveling path of the vehicle, and an object of a fifth type corresponding to another sensed object except for the objects of the first to fourth types, the vehicle further comprising a user interface configured to distinctively display the classified at least one object in the tracked 3D space.

10. The vehicle of claim 1, wherein the processor is further configured to distinguish an object area from a ground area based on the acquired spatial information over time, cluster the object area to distinguish the individual object areas.

11. The vehicle of claim 10, wherein the processor is further configured to predict a movement of an object of interest among the identified at least one object in the tracked 3D space.

12. A sensing device comprising:
a sensor unit configured to successively sense a three-dimensional (3D) space by using at least one sensor;
a communication interface;
a memory storing an computer executable instruction; and
a processor configured to execute the computer executable instruction to acquire spatial information over time for the sensed 3D space, identify at least one object in the sensed 3D space by applying a neural network based object classification model to the acquired spatial information over time, track the sensed 3D space including the identified at least one object, and transmit information related to the tracked 3D space through the communication interface,
wherein the processor is further configured to determine individual object areas from the acquired spatial information over time, determine object information of the at least one object identified by applying the neural network based object classification model to the acquired spatial information over time, and track the sensed 3D space based on the object information and the individual object areas.

13. The sensing device of claim 12, wherein the sensor unit comprises at least one 3D light detection and ranging (LiDAR) sensor configured to acquire data for a space of a 360-degree range, and at least one selected from the group consisting of a radar sensor and an ultrasonic sensor configured to acquire data for a blind spot that the 3D LiDAR sensor fails to sense or data for a near space within a predetermined distance from the sensing device.

14. The sensing device of claim 12, wherein the processor is further configured to determine attribute information of at least one of selected from the group consisting a kind, 3D shape, location, position, size, trajectory, and speed of the at least one object identified in the sensed 3D space to track the 3D space, and transmit information related to the tracked 3D space to at least one selected from the group consisting of a vehicle, another sensing device, and a server within a predetermined distance from the sensing device through the communication interface.

15. The sensing device of claim 12, wherein the processor is further configured to receive, from the sensor unit, a time stamp in which time information is recorded and data for the sensed 3D space, and create a 3D image corresponding to the spatial information over time for the sensed 3D space.

16. The sensing device of claim 12, wherein the processor is further configured to distinguish an object area from a ground area based on the acquired spatial information over time, cluster the object area to distinguish the individual object areas.

17. The sensing device of claim 16, wherein the processor is further configured to predict a movement of an object of interest among the identified at least one object on the tracked 3D space.

18. A server comprising:
a communication interface;
a memory storing a computer executable instruction; and
a processor configured to execute the computer executable instruction to receive information related to a 3D space tracked by at least one vehicle and corresponding to a movement location of the at least one vehicle through the communication interface, receive information related to a 3D space tracked by at least one sensing device installed on a path along which the vehicle travels and corresponding to a fixed location of the at least one sensing device through the communication interface, and reconstruct information related to a 3D space corresponding to a predetermined region to which both the movement location of the at least one vehicle and the fixed location of the at least one sensing device belong, based on the information related to the 3D space corresponding to the movement location of the at least one vehicle and the information related to the 3D space corresponding to the fixed location of the at least one sensing device,
wherein the information related to the 3D space corresponding to the movement location of the at least one vehicle is configured to be obtained by determining first individual object areas from spatial information over time acquired by the at least one vehicle, determining first object information of at least one object identified by applying a neural network based object classification model to the spatial information over time acquired by the at least one vehicle, and tracking the 3D space corresponding to the movement location of the at least one vehicle based on the first object information and the first individual object areas, and
wherein the information related to the 3D space corresponding to the fixed location of the at least one sensing device is configured to be obtained by determining second individual object areas from spatial information over time acquired by the at least one sensing device, determining second object information of at least one object identified by applying a neural network based object classification model to the spatial information over time acquired by the at least one sensing device, and tracking the 3D space corresponding to the fixed location of the at least one sensing device based on the second object information and the second individual object areas.

19. The server of claim 18, wherein the processor is further configured to transmit the reconstructed information related to the 3D space corresponding to the predetermined region to an integrated server of an upper layer through the communication interface.

\* \* \* \* \*